Figure 5A:
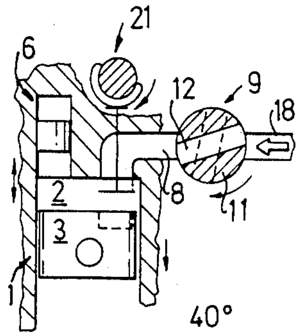

United States Patent [19]
Hedelin

[11] Patent Number: 4,572,116
[45] Date of Patent: Feb. 25, 1986

[54] INTERNAL COMBUSTION ENGINE

[76] Inventor: Lars G. B. Hedelin, Skärsnäsvägen 5, S-18263 Djursholm, Sweden

[21] Appl. No.: 545,384

[22] PCT Filed: Jan. 31, 1983

[86] PCT No.: PCT/SE83/00032

§ 371 Date: Sep. 28, 1983

§ 102(e) Date: Sep. 28, 1983

[87] PCT Pub. No.: WO83/02645

PCT Pub. Date: Aug. 4, 1983

[30] Foreign Application Priority Data

Jan. 29, 1982 [SE] Sweden ................................ 8200506

[51] Int. Cl.[4] ................................................ F02B 75/04

[52] U.S. Cl. ................................ 123/78 D; 123/190 B; 123/190 BD

[58] Field of Search ............. 123/78 D, 78 A, 78 AA, 123/79 R, 190 A, 190 B, 190 BD, 316

[56] References Cited

U.S. PATENT DOCUMENTS 1,521,077 12/1924 Clegg .

1,574,971 3/1926 Horvath ............................ 123/79 R 3,948,227 4/1976 Guenther ......................... 123/190 A 3,970,056 7/1976 Morris ........................... 123/78 AA 4,075,986 2/1978 Keck ................................ 123/79 R

FOREIGN PATENT DOCUMENTS 251748 5/1910 Fed. Rep. of Germany .

2938118 4/1981 Fed. Rep. of Germany .

*Primary Examiner*—William A. Cuchlinski, Jr.
*Attorney, Agent, or Firm*—Ostrolenk, Faber, Gerb & Soffen

[57] ABSTRACT

An internal combustion engine has at least one chamber (2) where there is a moving working member (3), an inlet valve (4) and an outlet valve (5) as well as a compression regulation device (6). In an inlet channel (8) there is arranged a regulating valve (9) upstream of the inlet valve (4), said regulating valve being open only during a portion of the motion cycle of the working member. This regulating valve has a rotatable valve body (11) provided with at least one inlet passage (12), the rotational speed of the body being proportional to that of the engine.

16 Claims, 26 Drawing Figures

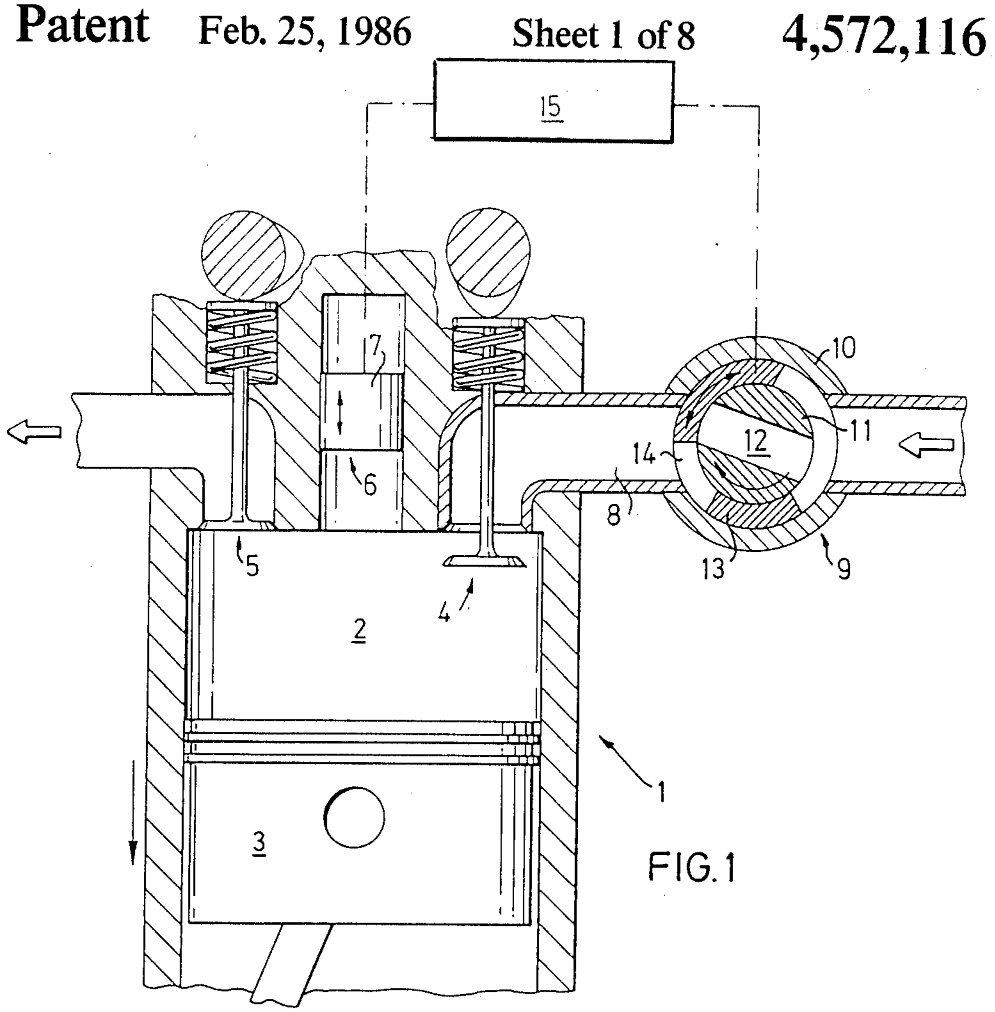
FIG. 1
FIG. 2
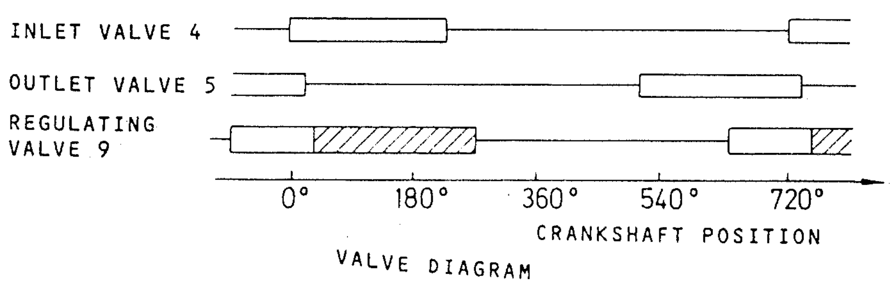

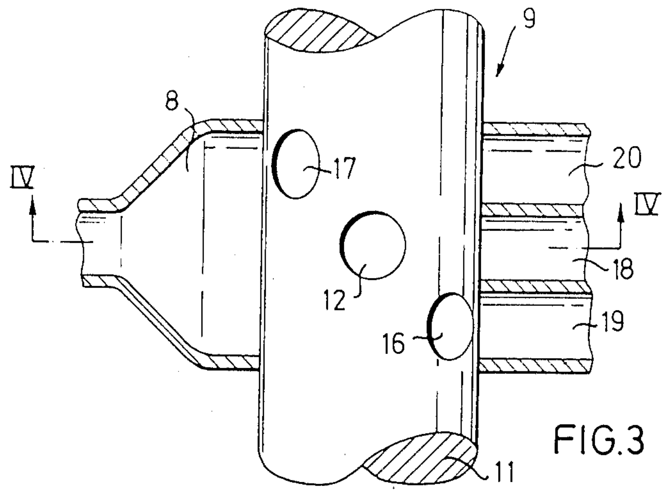
FIG.3
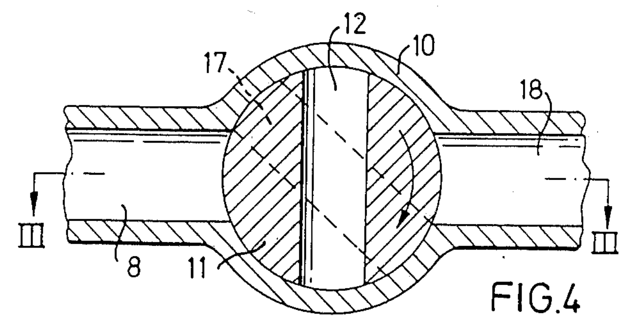
FIG.4
FIG.6
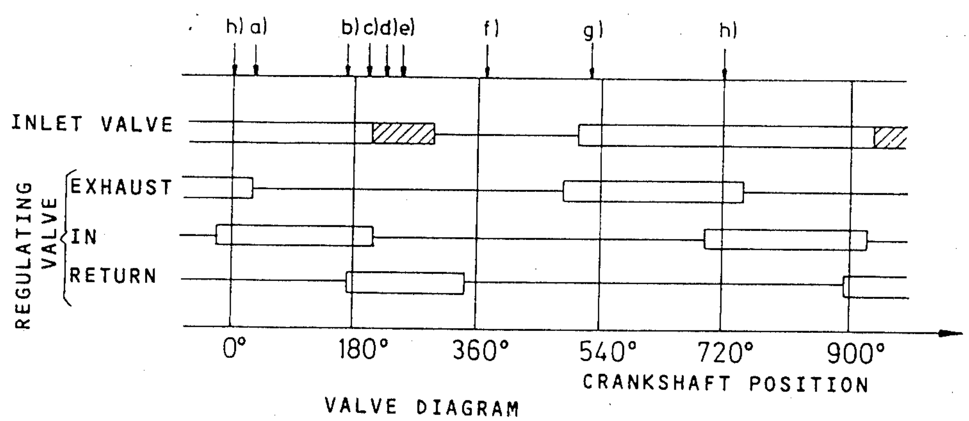
VALVE DIAGRAM

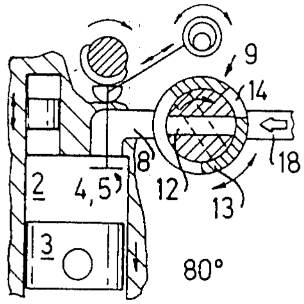
FIG.7a
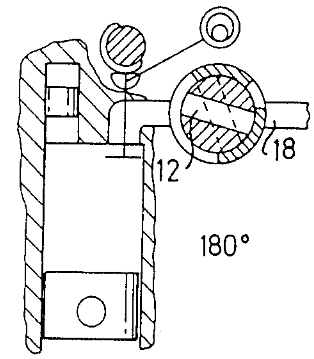
FIG.7b
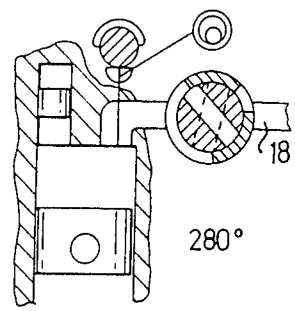
FIG.7c
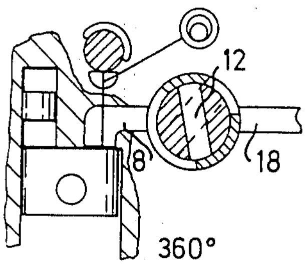
FIG.7d
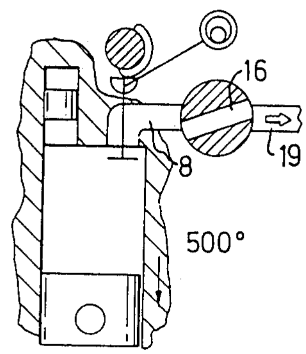
FIG.7e
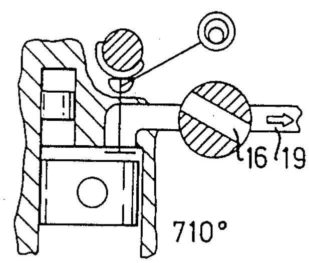
FIG.7f
FIG. 8
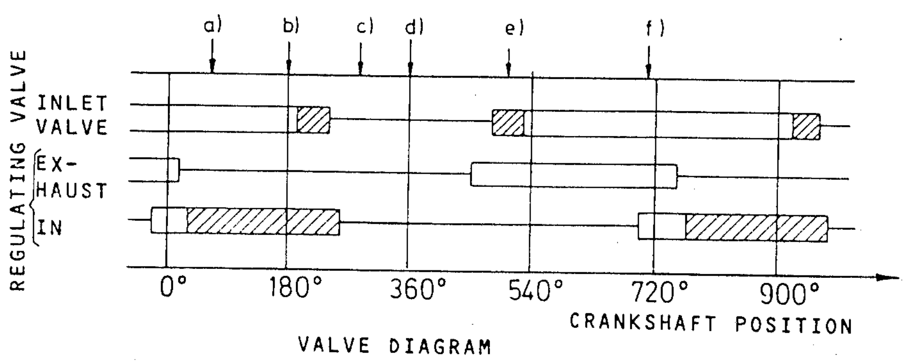
VALVE DIAGRAM

INTERNAL COMBUSTION ENGINE

The invention relates to an internal combustion (IC) engine with at least one chamber where there is a moving working member via which a gaseous working medium is compressed, and after the supply of heat executes work, at least one inlet valve and at least one outlet valve and a device for regulating compression.

In IC engines the inflow and outflow are usually controlled with the aid of port or mushroom valves which open and close at predetermined crank shaft positions, independent of the current load to which the engine is subjected, while the flow is varied with the aid of a constricting means in the inlet. This leads to varying compression pressure at varying load, with consequent difficulty in obtaining good efficiency. Attempts have therefore been made to control the compression with the aid of a compression regulation device in a more favourable way, thereby to improve the efficiency, but the efficiency will still vary greatly for different degrees of load as a result of difficulties in obtaining a flow of air through the engine which is optimum for varying loads.

The object of the invention is to eliminate said disadvantages and enable better control of the flow through an IC engine.

This is achieved in accordance with the invention in that upstream of the inlet valve there is an inlet channel and therein a regulating valve adapted for being open only during a portion of the motion cycle of the working member. To advantage, there is incorporated in the regulating valve a valve body rotatable in a valve housing and provided with at least one inlet passage, the speed of rotation (rpm) of which is proportional to the rpm of the engine crank shaft.

By utilizing a regulating valve in accordance with the invention, in combination with conventional valves, there is enabled more accurate regulation of the flow through the engine than was possible earlier, so that better efficiency can be obtained.

Figure 9:
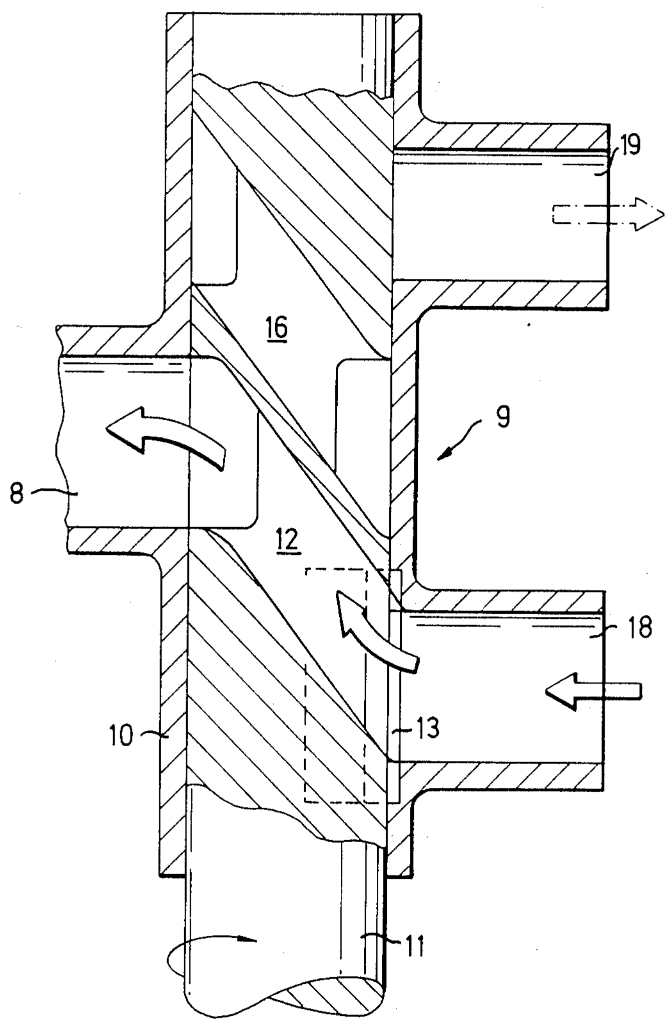
Figure 10:
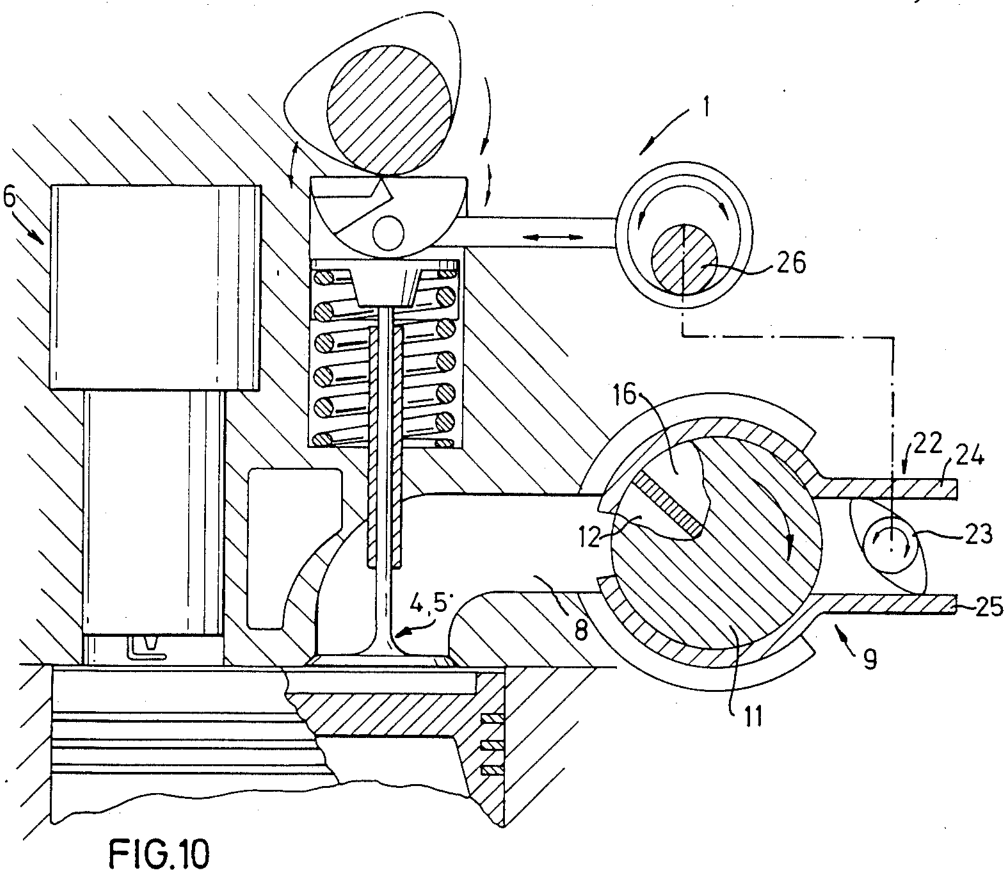
Figure 11:
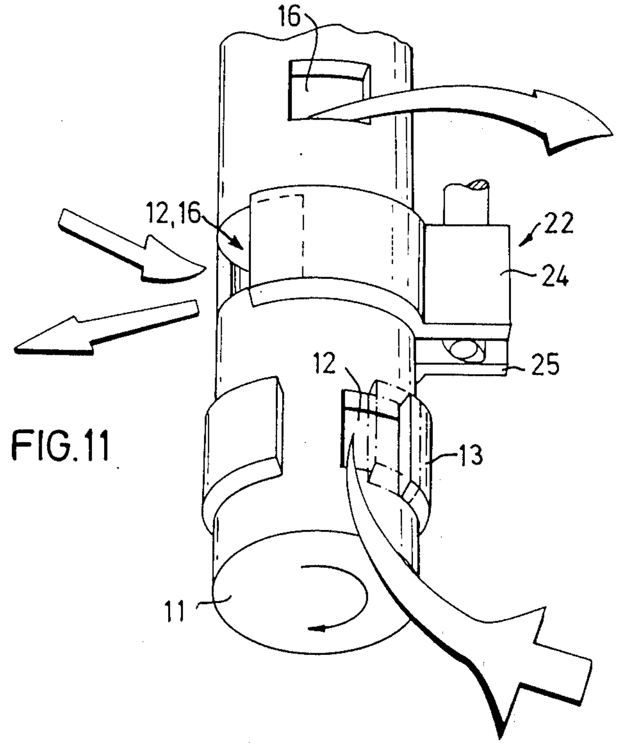
Figure 12:
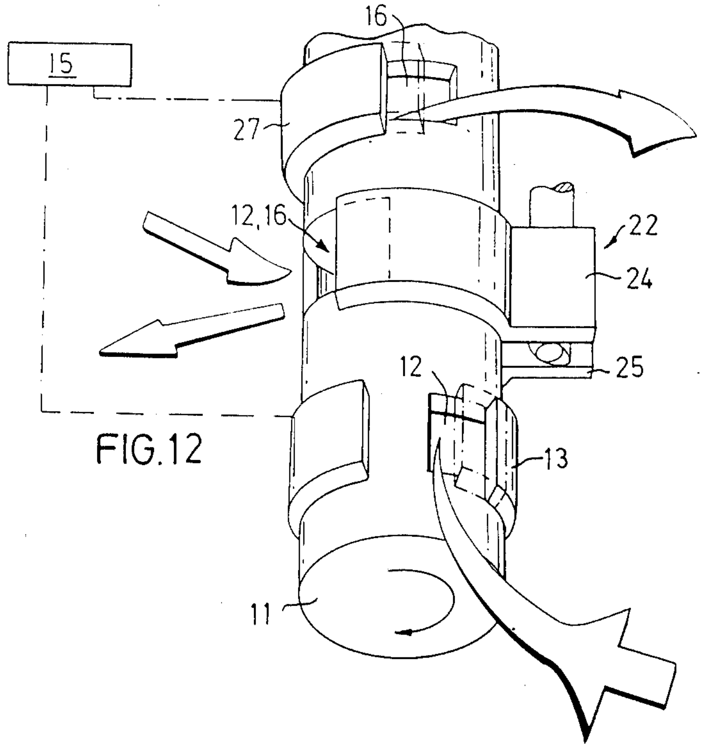
Figure 13:
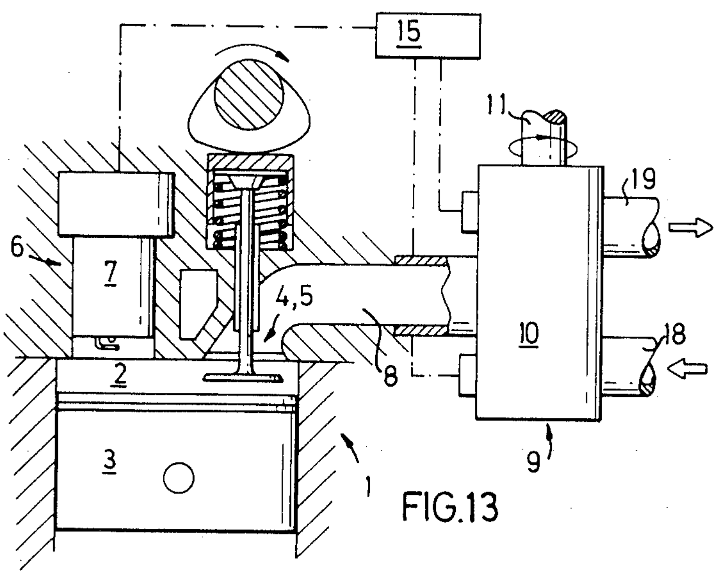
Figure 14:
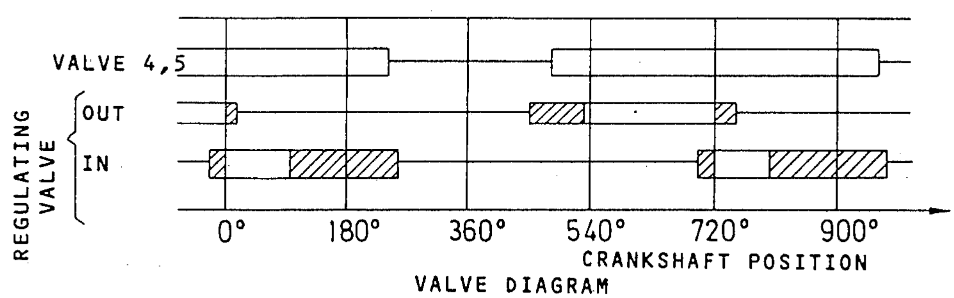

The invention will now be described in detail with the aid of an embodiment illustrated on the appended drawing, where FIG. 1 illustrates a first embodiment of an IC engine in accordance with the invention, provided with a first embodiment of a regulating valve, FIG. 2 is a valve diagram for the engine in FIG. 1, FIG. 3 is a section along the line III—III in FIG. 4, through a second embodiment of a regulating valve, FIG. 4 is a section along the line IV—IV in FIG. 3, FIGS. *5a–h* schematically illustrate the function of a second embodiment of an engine in accordance with the invention, equipped with a regulating valve according to FIGS. 3 and 4, FIG. 6 is a valve diagram for the engine in FIG. 5, FIGS. *7a–f* illustrates a still further embodiment of an engine in accordance with the invention, provided with a still further type of regulating valve, FIG. 8 is a valve diagram for the engine in FIG. 7, FIG. 9 is a longitudinal section through a regulating valve in the engine in FIG. 7, FIG. 10 schematically illustrates an engine of the same type as in FIG. 7, but with a modified regulating valve, FIG. 11 is a perspective view of a portion of a regulating valve according to FIG. 10, FIG. 12 illustrates a variant of the embodiment in FIG. 11, FIG. 13 schematically illustrates an engine with a regulating valve according to FIG. 12, and FIG. 14 is a valve diagram for the engine in FIG. 13.

A four-stroke-type IC engine 1, only partially indicated in FIG. 1, has one or more chambers 2, of which only one is illustrated in the Figure. In each such chamber there is a working member 3 implemented as a reciprocating piston, this piston being depicted on the drawing between its top and bottom dead centres, on its way down. Flow into the chamber 2 is controlled by an inlet valve 4 and the flow out from the chamber by an outlet valve 5.

For regulating the compression there is a device 6, e.g. of the type described in the international patent application PCT/SE 82/00275, where a piston 7 is settable to a desired position.

Upstream of the inlet valve 4, in an inlet channel 8, there is a regulating valve 9, with the aid of which it is possible further to regulate the flow into the chamber 2. In the regulating valve 9 there is included a valve body 11 having an inlet passage 12 and being rotatable in a valve housing 10. The valve body 11 rotates at an rpm proportional to the rpm of the engine crank shaft, the regulating valve 9 accordingly being open only under a part of the motion cycle of the working means 3. A screening member 13, having an orifice 14 intended for coaction with the inlet passage 12, is arranged in the valve housing 10 included in the regulating valve 9. The screening member 13 is movable circumferentially about the valve body 11 for blocking off a varying portion of the cross-sectional area of the inlet channel 8. Both compression regulation device 6 and screening member 13 are connected to a setting means 15 which, on the basis of information received on the engine's current load, regulates the member 13 into a position such that a quantity of air proportional to the current load on the engine is allowed to pass the regulating valve 9, and also sets the compression regulation device in a position corresponding to the quantity of air flowing into the chamber 2, so that the same compression pressure is always obtained in the chamber 2, independent of the load at which the engine is working. In the example illustrated in FIG. 1 the engine is working at about 50% of maximum load. The screening member 13 is therefore set to a position where it blocks about half the cross section of the inlet channel 8, which means that only about half of the maximum possible quantity of air can pass through the regulating valve 9. In this case the piston 3 has travelled about halfway between its top and bottom dead centres when the regulating valve 9 closes. Accordingly, no further air can flow into the chamber 2, in spite of the inlet valve 4 still being open. As a result of the prevailing load, the piston 7 in the compression regulation device 6 has been placed halfway between its two end positions.

The interaction between the inlet valve 4, outlet valve 5 and regulating valve 9 will be seen more closely from FIG. 2, where the different rectangles denote for what crankshaft positions the respective valves are open. As is customary, the piston 3 is at top dead centre (TDC) for the crankshaft positions 0°, 360°, 720° etc. and at bottom dead center (BDC) for the crankshaft positions 180°, 540° etc. The sectioned portion of the "valve open" rectangle for the regulating valve 9 denotes the area within which the regulating valve may be closed, depending on what load the engine is working at for the moment.

In order to prevent that the engine filling degree is deteriorated for increasing rpm, the valve body 11 may be provided with a turning control influenced by the engine rpm and affecting the motion of the valve body for increasing rpm so that the body 11 is turned somewhat in a direction counter to its normal direction of rotation, whereby the closing time for the regulating valve 9 is delayed somewhat.

The screening member 13 may also be provided with an adjusting device regulating its position in relation to the volume alteration per crankshaft degree occurring when the piston moves downward on its way from TDC to BDC. This volume alteration per crankshaft degree varies greatly, and for this reason the filling degree also varies as a result of the constriction of the inlet area taking place before the valve is completely closed. Such a regulating function can be achieved with the aid of a link mechanism, for example, with an arm and a roller following a cam curve, thus balancing the filling degree so that the inducted quantity of air is in a proportion to the compression volume such that maximum permitted pressure and temperature levels are always obtainable during the compression and combustion phases, independent of the prevailing rpm and of how large a part of the possible volume of the chamber is utilized at the moment.

Control of the flow through the engine can otherwise take place by the valve times for the inlet valve 4 and outlet valve 5 being adjusted to the prevailing rpm. The control mechanism can either be mounted on the camshaft, e.g. of the type described in the international patent application PCT/SE81/00259, or be placed between the camshaft and rocker arm, and be of the type such as described in the Swedish patent application No. 8107709-1. Accordingly, it will be possible to maintain a substantially unaltered maximum torque over the entire rpm range of the engine. The regulator having the task of finely adjusting the position of the valve body 11 as a function of the rpm may possibly be replaced by a regulating mechanism corresponding to that influencing the screening member 13.

A regulating valve 9 with another implementation than that illustrated in FIG. 1 is illustrated in FIGS. 3 and 4.

Further to an inlet passage 12 the valve body 11 also has an exhaust passage 16 and a return passage 17. Via the regulating valve 9, the inlet channel 8 may be put into communication with an inlet channel 18, an exhaust channel 19 and a return channel 20 via the respective inlet passage 12, exhaust passage 16 and return passage 17, as a function of the rotation of the valve body 11. This type of regulating valve can to advantage be used in an IC engine 1 of the type schematically illustrated in FIG. 5. As distinguished from the engine in FIG. 1, the inlet valve 4 and outlet valve 5 have here been combined to a single valve 4,5 via which all flows to and from the chamber 2 take place. As previously, there is a compression regulation device 6. The motion of the valve 4,5 is controlled by a special valve control device 21, with the aid of which the opening and closing position of the valve can be varied.

Figure 5B:
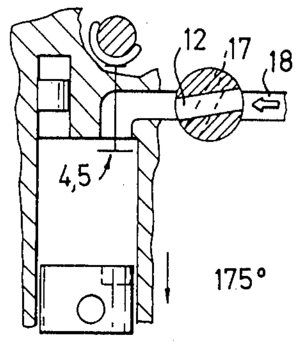
Figure 5C:
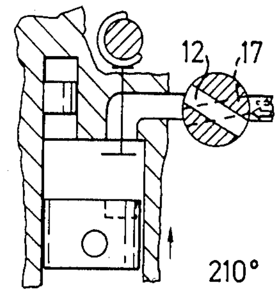
Figure 5D:
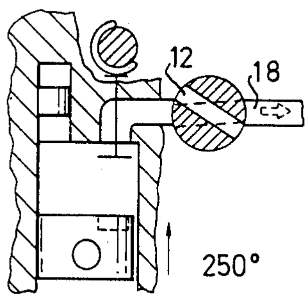
Figure 5E:
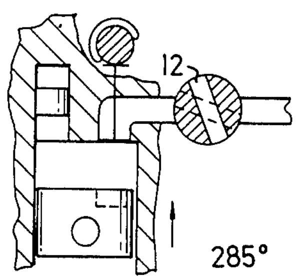
Figure 5F:
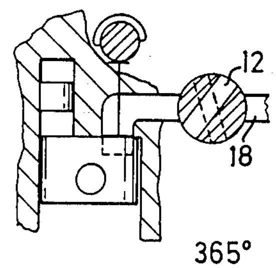
Figure 5G:
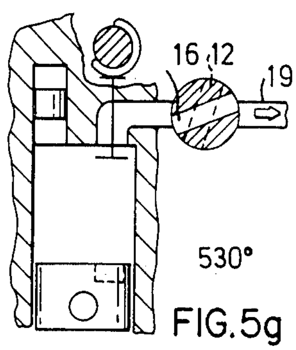
Figure 5H:
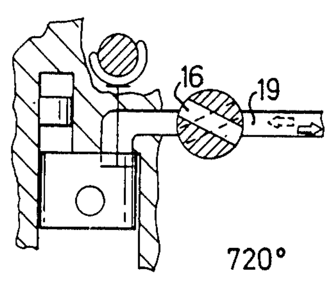

According to FIGS. 5*a* and 5*b* the regulating valve 9 is in a position such that air via the inlet channel 18, inlet passage 12, inlet channel 8 and the open valve 4,5 may be inducted into the chamber 2 when the piston 3 is on its way downwards. In the crankshaft position of 210° illustrated in FIG. 5*c*, the piston 3 is on its way upwards while the valve 4,5 is still open. Via the return passage 17 the inlet channel 8 is now also in communication with the return channel 20, whereby return delivery of air already inducted can take place. This return delivery continues in the crankshaft position illustrated in FIG. 5*d*, where the inlet passage 12 is now blocked. When the piston 3 has reached the crankshaft position 285° illustrated in FIG. 5*e*, outflow via the return passage 17 is still possible, but is now obstructed by the valve 4,5 being closed. By selection of the time for closing the valve 4,5, a desired proportion of the air inducted into the chamber 2 can be retained for compression. By adjusting the setting of the compression regulation device 6, a constant compression pressure may accordingly always be obtained, independent of at what position the valve 4,5 closes. In FIG. 5*f*, the working phase has just begun. In the crankshaft position 530° illustrated in FIG. 5*g*, the valve 4,5 has opened, simultaneously as the inlet channel 8, now serving as an exhaust gas channel, has come into communication with the exhaust gas channel 19 via the exhaust gas passage 16. Exhaust gases can thus flow out from the chamber 2. Exhaust gas discharge subsequently continues during the upward movement of the piston and, as will be seen from FIG. 5*h*, new air can begin to be inducted into the chamber 2 during the final phase of the exhaust gas discharge, as a result of the inlet channel 8 now also being in communication with the inlet channel 18 via the inlet passage 12.

The opening and closing positions for the different valves in the engine of FIG. 5 are also apparent from the valve diagram in FIG. 6, which is constructed in the same way as in FIG. 2. In this embodiment the closing position of the valve 4,5 thus determines how large a part of the total amount of inducted air is to be retained in the engine for compression. The relative positions of the inlet passage 12 and exhaust passage 16 are such that in the final phase the discharging exhaust gas has a certain suction effect on the inflowing air in the initial position.

The valve times for the valve 4,5 can be regulated in this embodiment with the aid of a settable cam device enabling the selection of both opening and closing position for the valve 4,5. Such a device may be implemented, for example, according to the previously mentioned International Patent Application PCT/SE81/00259. The valve may also be regulated with the aid of a mechanism placed between the camshaft and the rocker arm itself. Such a mechanism is described in the already mentioned Swedish Patent Application No. 8107709-1.

The embodiment of an IC engine illustrated in FIG. 7 distinguishes from the one illustrated in FIG. 5 in that another type of regulating valve 9 is used. This regulating valve has, similar to the embodiment according to FIGS. 3 and 4, both an inlet passage 12 and an exhaust passage 16, but lacks a return passage 17. On the other hand, as with the embodiment according to FIG. 1, it has a screening member 13 cooperating with the inlet passage 12. The regulating valve 9 is shown in FIG. 9.

The function is as follows: The valve 4,5 is open in the crankshaft position 80° illustrated in FIG. 7*a*, and the chamber 2 is thereby in communication with the inlet channel 18 via the inlet channel 8 and inlet passage 12. In response to variations in the load, the screening member 13 is regulated in a manner corresponding to the embodiment according to FIG. 1 to a position such that induction is nearly terminated at this crankshaft position. In FIG. 7*b*, the piston 3 has arrived at BDC, and the screening member now blocks the inlet passage 12. The quantity of air already inducted into the chamber 2 has now been subjected to a reduction in pressure. In FIG. 7*c*, compression of the inducted air is in progress, with the valve 4,5 in its closed position. The working phase begins at the crankshaft position illustrated in FIG. 7*d*, and by degrees the inlet channel 8, serving also as exhaust channel, is put in communication with the exhaust channel 19 via the exhaust passage 16. As will be seen from FIG. 7*e*, when the valve 4,5 has opened, exhaust gases can flow out from the chamber 2 right up until the time when the piston 3 approaches TDC, as in FIG. 7*f*.

How the different valves in FIG. 7 coact is clarified by the valve diagram in FIG. 8.

The mushroom valve 4,5 illustrated in FIG. 7 thus has the task of letting in air and breaking off the induction phase when the engine is working with a heavy load. The valve also has the task of letting out exhaust gases and regulating the time when the exhaust phase can begin.

In the embodiment according to FIG. 7, and in the same way as in the embodiment according to FIG. 1, there takes place a setting of the screening member 13 and compression regulation device 6 in response to the amount of air used in the engine at the prevailing engine load. There is accordingly ensured that the amount of air used is always compressed to the pressure and temperature level which may be permitted as a maximum in the engine. Regulation of the engine power stroke takes place solely by varying the size of the mass of gas utilized by the engine per work cycle. The size of the momentarily utilized volume in the engine and the size of the momentarily delivered torque are always in a constant relationship to each other. The fuel is supplied with a fixed air-fuel ratio in relation to the size of the working volume utilized for the moment. The valve time for the mushroom valve is suitably regulated in relation to the engine rpm. The cycle according to FIG. 7 relates to an engine working at about 40% maximum load.

An IC engine 1 of substantially the same type as in FIG. 7 is illustrated in FIG. 10, but in this case with a modified regulating valve 9, more closely shown in FIG. 11. As with the embodiment according to FIG. 9, both inlet passage 12 and exhaust passage 16 go from axially separated places along the valve body 11 to a point opposite the inlet channel 8, with which they can simultaneously be in communication during a certain portion of a full revolution of the valve body 11. Directly opposite the inlet channel 8 there is a special screening member 22 incorporated in the regulating valve 9, and with the aid of which it is possible to regulate the time during which the inlet passage 12 and exhaust passage 16 are in simultaneous communication with the inlet channel 8, then also serving as an exhaust channel. By turning a cam means 23, two different screens 24 and 25 may be displaced in opposite directions circumferentially to the valve body 11, so that a larger or smaller portion of the inlet channel 8 is blocked. As with a shaft 26 for regulating the motion of the valve 4,5, the motion of the cam means 23 can suitably be coupled to the engine rpm.

As has been illustrated here, a regulating valve in accordance with the invention may be used together with a four-stroke engine of the Otto or Diesel type having one or more mushroom valves, but it is also possible to use the regulating valve in engines provided with port valves, e.g. Wankel engines, an ordinary two-stroke engine or a two-stroke Diesel engine.

The International Patent Application PCT/SE82/00275 is referred to in respect of the arrangement for sensing the current load on the engine and for regulating the compression ratio in chamber 2 as a function of the prevailing load.

The regulating valve illustrated in FIG. 11 may be further modified by a screening member 27 being placed for coaction with the exhaust passage 16. Depending on what position the screening member 27 is placed in, the regulating valve 9 will open for exhaust at different times. The setting position for both screening members 13 and 27 can suitably be controlled by the setting means 15, in response to the current engine load.

The engine 1 illustrated in FIG. 13 is provided with a regulating valve 9 of the type illustrated in FIG. 12, as well as with a combined inlet and outlet valve 4,5 having fixed opening and closing positions. The size of the gas mass utilized by the engine per working cycle is regulated entirely by the screening members included in the regulating valve 9 being put into suitable positions with the aid of the setting device 15 such that desired through-flow is obtained. Similar with previously described embodiments, the compression is regulated with the aid of a compression regulation device 6 connected to the setting device 15.

As will be seen from FIG. 14, the combined inlet and outlet valve 4,5 is open the whole time that the regulating valve 9 can allow through-flow via either inlet valve passage 12 or exhaust passage 16, or via both simultaneously. The inflow via the inlet passage 12 is regulated with the aid of the screening member 13 and the screen 25 in the screening device 22. The position of the screen 25 determines when the inflow can begin, according to the sectioned left-hand portion of the opening time rectangle for inflow via the regulating valve, and the setting of the screening member 13 determines when the inflow is to be interrupted, according to the sectioned right-hand portion of the open time rectangle. In a corresponding way the outflow via the exhaust passage 16 is regulated with the aid of the screening member 27 and the screen 24 of the screening member 22. The setting of the screening member 27 determines when the outflow can begin, according to the sectioned left-hand portion of the open time rectangle for outflow via the regulating valve, and the position of the screen 24 determines when the outflow is to be interrupted, according to the sectioned right-hand portion of the open time rectangle. The regulating valve thus achieves total control of the flow cycle by determining when inflow is to be broken off, when outflow is to begin, as well as when outflow is to be broken off and when inflow is to begin. The combined inlet and outlet valve 4,5 can therefore have fixed opening and closing positions, suitably adapted to the piston position. As will be seen from FIG. 14, the screening device 22 enables allowing simultaneous in- and outflow via the regulating valve 9 during a time period of regulatable length.

I claim:

1. An internal combustion engine comprising:

an engine having at least one chamber defined therein, a combined channel defined in the engine and communicating with the chamber for the flow of gas both into and out of the chamber; the engine having an inlet channel defined therein and communicating with the combined channel for inflowing gas into the combined channel and an exhaust channel defined therein and communicating with the combined channel for outflowing gas out of the combined channel;

a movable working member in the chamber for compressing gas in the chamber;

regulating means for regulating the compression of the gas in the chamber by the movable working member;

valve means for controlling the flow of gas between the chamber and the combined channel, the valve means comprising a combined inlet and outlet valve, the combined inlet and outlet valve being movable between an open position for permitting the flow of gas between the chamber and the combined channel and a closed position for preventing the flow of gas therebetween; and a regulating valve for opening and closing connections between the combined channel and the inlet and exhaust channels for regulating the flow of gas therebetween.

2. The engine of claim 1 in which the combined inlet and outlet valve comprises a mushroom-shaped valve.

3. The engine of claim 2, further comprising a crank shaft connected for rotating in response to the movable working member, the valve means further comprising a timing means for regulating the times at which the mushroom-shaped valve moves between the open and closed positions in response to the speed of rotation of the crankshaft.

4. The engine of claim 1 in which the engine further has a valve housing defined therein; the combined channel, the inlet channel and the exhaust channel each being connected to the valve housing for communicating with each other; the regulating valve comprising a rotatable valve body in the valve housing, the valve body having an inlet passage defined therein for connecting the combined channel to the inlet channel during a first part of the valve body rotation and an exhaust passage for connecting the combined channel to the exhaust channel during a second part of the valve body rotation.

5. The engine of claim 4, further comprising a crank shaft connected for rotating in response to the movable working member, the valve body being connected for rotating at a speed proportional to the speed of rotation of the crank shaft.

6. The engine of claim 4 further comprising timing means for regulating the times at which the inlet and outlet valve moves between the open and closed positions and for controlling the rotation of the valve body.

7. The engine of claim 6 in which the timing means is operable for beginning the first part of the valve hody rotation after the inlet and outlet valve moves to the open position.

8. The engine of claim 6 in which the timing means is operable for ending the first part of the valve body rotation before the inlet and outlet valve moves to the closed position.

9. The engine of claim 8 in which the inlet passage and the exhaust passage are oriented in the valve body for connecting both the inlet channel and the exhaust channel to the combined channel during a simultaneous portion of the first and second parts of the valve body rotation.

10. The engine of claim 4 in which the regulating valve further comprises a screening member in the valve housing for cooperating with the inlet passage for connecting the combined channel to the inlet channel, the screening member being movable between a plurality of positions for varying the length of the first part of the valve body rotation for controlling the quantity of gas flowing into the chamber.

11. The engine of claim 10 further comprising setting means for setting the position of the screening member, the setting means being operable for setting the screening member position in response to the load on the engine for regulating the quantity of gas flowing into the chamber.

12. The engine of claim 11, in which the regulating means is movable between a plurality of positions for regulating the compression of the gas in the chamber, the setting means being further operable for setting the position of the regulating means for maintaining a level of compression in the chamber substantially independent of the load on the engine.

13. The engine of claim 11 in which the setting means is further operable for setting the position of the screening member for varying the length of the first part of the valve body rotation in proportion to the load on the engine.

14. The engine of claim 4, further comprising a crank shaft connected for rotating in response to the movable working member and timing means for regulating the times at which the inlet and outlet valve moves between the open and closed positions in response to the speed of rotation of the crank shaft.

15. The engine of claim 14 in which the engine further has a return channel defined therein and communicating with the combined channel for returning gas from the chamber out of the engine before the movable working member compresses the gas in the chamber, the valve body further having a return passage defined therein for connecting the combined channel to the return channel during a third part of the valve body rotation; the timing means being further operable for moving the inlet and outlet valve to the closed position at a variable closing time during the third part of the valve body rotation in response to the load on the engine, the variable closing time being selected for ending the return of gas from the chamber before the movable working member begins compressing the gas in the chamber.

16. The engine of claim 15 in which the regulating means is movable between a plurality of positions for regulating the compression of the gas in the chamber, the engine further comprising setting means for setting the position of the regulating means in response to the load on the engine for achieving a level of compression in the chamber substantially independent of the load on the engine.

* * * * *